United States Patent
Hagino et al.

(10) Patent No.: US 8,696,049 B2
(45) Date of Patent: Apr. 15, 2014

(54) VEHICLE BODY STRUCTURE

(75) Inventors: Katsuya Hagino, Kawasaki (JP); Youhei Ogawa, Atsugi (JP); Michio Kudou, Yamato (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1463 days.

(21) Appl. No.: 12/055,006

(22) Filed: Mar. 25, 2008

(65) Prior Publication Data

US 2008/0246311 A1 Oct. 9, 2008

(30) Foreign Application Priority Data

Apr. 5, 2007 (JP) ................................. 2007-099744
Dec. 21, 2007 (JP) ................................. 2007-329571

(51) Int. Cl.
*B62D 25/08* (2006.01)
*B60H 1/28* (2006.01)

(52) U.S. Cl.
USPC .......................................................... 296/192

(58) Field of Classification Search
USPC .................... 296/192, 208; 454/147
See application file for complete search history.

(56) References Cited

U.S. PATENT DOCUMENTS

| | | | | |
|---|---|---|---|---|
| 2,852,997 A | * | 9/1958 | Leslie et al. | 454/147 |
| 4,332,187 A | * | 6/1982 | Imai et al. | 454/147 |
| 4,819,550 A | * | 4/1989 | Ioka | 454/147 |
| 5,127,703 A | * | 7/1992 | Takahashi | 296/192 |
| 5,145,457 A | * | 9/1992 | Tanigaito et al. | 454/147 |
| 5,580,122 A | * | 12/1996 | Muehlhausen | 296/193.02 |
| 6,347,989 B1 | * | 2/2002 | Marko et al. | 454/147 |
| 2004/0124669 A1 | * | 7/2004 | Eynon et al. | 296/192 |
| 2009/0146459 A1 | * | 6/2009 | Watanabe et al. | 296/192 |

FOREIGN PATENT DOCUMENTS

| | | |
|---|---|---|
| DE | 19811189 | 9/1999 |
| DE | 102005011479 | 9/2006 |
| EP | 0301494 | 2/1989 |
| EP | 1595771 | 11/2005 |
| JP | 2003-118641 | 4/2003 |
| JP | 2005-306234 | 11/2005 |
| JP | 2005-313692 | 11/2005 |

OTHER PUBLICATIONS

Machine Translation of foregin reference # JP 2005-306-234.*
Espacenet abstract of JP2005306234, published Nov. 4, 2005 (1 page).
Espacenet abstract of JP2005313692, published Nov. 10, 2005 (1 page).

(Continued)

*Primary Examiner* — H Gutman
(74) *Attorney, Agent, or Firm* — Osha Liang LLP

(57) ABSTRACT

A vehicle body structure includes a cowl extending in a vehicle transverse direction at an upper rear section of an engine compartment, an air inlet to introduce outside air into a vehicle cabin from the cowl, a fluid discharge channel provided at the bottom of the cowl, the fluid discharge channel inclined to guide fluid entering the cowl to a drain opening disposed at a transverse end of the cowl, a one-way valve disposed inside the cowl at a position corresponding to the drain opening, the one-way valve including a flapper operable to open and close the drain opening in response to a differential pressure generated when air flows through the air inlet and a frame comprising a valve opening corresponding to the drain opening, wherein the one-way valve covers the drain opening.

20 Claims, 5 Drawing Sheets

(56) References Cited

OTHER PUBLICATIONS

Office Action in Chinese Patent Application No. 2008100906275 mailed Jun. 26, 2009 and English translation thereof (11 pages).
English Patent Abstract of JP2003-118641 from esp@cenet.com, published Apr. 23, 2003 (1 page).
English Patent Abstract of EP1595771 from esp@cenet, Published Nov. 16, 2005 (1 page).
English Patent Abstract of DE102005011479 from esp@cenet, Published Sep. 14, 2006 (1 page).
English Patent Abstract of DE19811189 from esp@cenet, Published Sep. 16, 1999 (1 page).
English Patent Abstract of EP0301494 from esp@cenet, Published Feb. 1, 1989 (1 page).
European Search Report for Application No. 08154061.9, dated Jun. 9, 2009 (7 pages).

* cited by examiner

VEHICLE BODY STRUCTURE

CROSS-REFERENCE TO RELATED APPLICATIONS

The present application claims priority from Japanese Patent Application No. 2007-099744, filed Apr. 5, 2007 and Japanese Patent Application No. 2007-329571 Filed Dec. 21, 2007. Both priority applications are hereby incorporated by reference in their entirety.

BACKGROUND OF THE DISCLOSURE

1. Field of the Disclosure

The present disclosure relates to a vehicle body structure having a one-way valve disposed at an end of a cowl in a vehicle width (i.e., transverse) direction, which quickly discharges rainwater or the like, and which prevents heat in an engine compartment from flowing into a vehicle cabin through an air inlet of the cowl.

2. Description of the Related Art

Vehicle body structures having one-way valves at an end of a cowl in a vehicle width direction are known (see, for example, Japanese Unexamined Patent Application Publication Nos. 2005-306234 and 2005-313692). Such one-way valves may be used to discharge rainwater or the like and to prevent heat in an engine compartment from flowing into a vehicle cabin through an air inlet of the cowl.

Formerly, one-way valves were positioned to partition a water channel in the cowl along the cross section thereof. Such former one-way valves included a frame having a drain opening and a flexible member disposed on the outer side of the frame with respect to the vehicle to selectively block the drain opening. The one-way valve was typically positioned downstream of an air inlet configured to introduce outside air into the vehicle cabin. Accordingly, the flexible member of the one-way valve operated to allow downstream flow of rain water through the drain opening and block the drain opening to prevent flow in the reverse direction.

Formerly, the one-way valve was typically installed following the assembly of the remainder of the vehicle body. First, a valve frame including an opening was attached at a position so that the valve frame partitioned a water channel in the vehicle body cowl along a cross section thereof. Following installation of the valve frame to the vehicle cowl, a flexible member was attached to the frame. Thus, a valve frame having an outer shape and size large enough to cover the cross section of the water channel is attached first. Then, the flexible member is passed through a small space in the valve frame to the other side and subsequently attached thereto. Therefore, the speed and efficiency in attaching the one-way valve assembly is low and costs incurred are high.

More particularly, the one-way valve was installed following the assembly of the remainder of the vehicle body, at which time a dash panel plate and a hood ridge for reinforcing the dash panel plate are disposed outside the end of the cowl in the vehicle width direction. Thus, the one-way valve could not be installed from the outside of the dash panel plate.

SUMMARY OF THE CLAIMED SUBJECT MATTER

In one aspect, the present disclosure relates to a vehicle body structure including a cowl extending in a vehicle transverse direction at an upper rear section of an engine compartment, an air inlet to introduce outside air into a vehicle cabin from the cowl, a fluid discharge channel provided at the bottom of the cowl, the fluid discharge channel inclined to guide fluid entering the cowl to a drain opening disposed at a transverse end of the cowl, a one-way valve disposed inside the cowl at a position corresponding to the drain opening, the one-way valve comprising a flapper operable to open and close the drain opening in response to a differential pressure generated when air flows through the air inlet and a frame comprising a valve opening corresponding to the drain opening, wherein the one-way valve covers the drain opening.

In another aspect, the present disclosure relates to a vehicle body structure including a cowl extending in a vehicle transverse direction at an upper rear section of an engine compartment, an air inlet to introduce outside air into a vehicle cabin from the cowl, a fluid discharge means provided in the cowl, the fluid discharge means configured to direct fluid entering the cowl to a drain means of the cowl, a valve means disposed inside the cowl at a position corresponding to the drain means, the valve means comprising a means open and close the drain means in response to a differential pressure generated when air flows through the air inlet and a frame comprising a valve opening corresponding to the drain means, wherein the valve means covers the drain means.

In another aspect, the present disclosure relates to a method to construct a vehicle body structure including installing a one-way valve assembly to a drain opening of a cowl from inside the cowl, wherein the one-way valve assembly comprises a blocking member comprising a flapper and a frame comprising at least one valve opening, securing the one-way valve about the drain opening such that a gap exists between a fluid discharge channel of the cowl and a bottom of the frame, creating a seal between a portion of the cowl about the drain opening and the frame with a peripheral portion of the secured blocking member, and covering the drain opening and the at least one valve opening with the flapper when air flows from the cowl through a vehicle interior inlet.

BRIEF DESCRIPTION OF DRAWINGS

Features of the present disclosure will become more apparent from the following description in conjunction with the accompanying drawings.

DETAILED DESCRIPTION

A vehicle body structure according to embodiments of the present disclosure will be described below with reference to the accompanying drawings.

Figure 1:
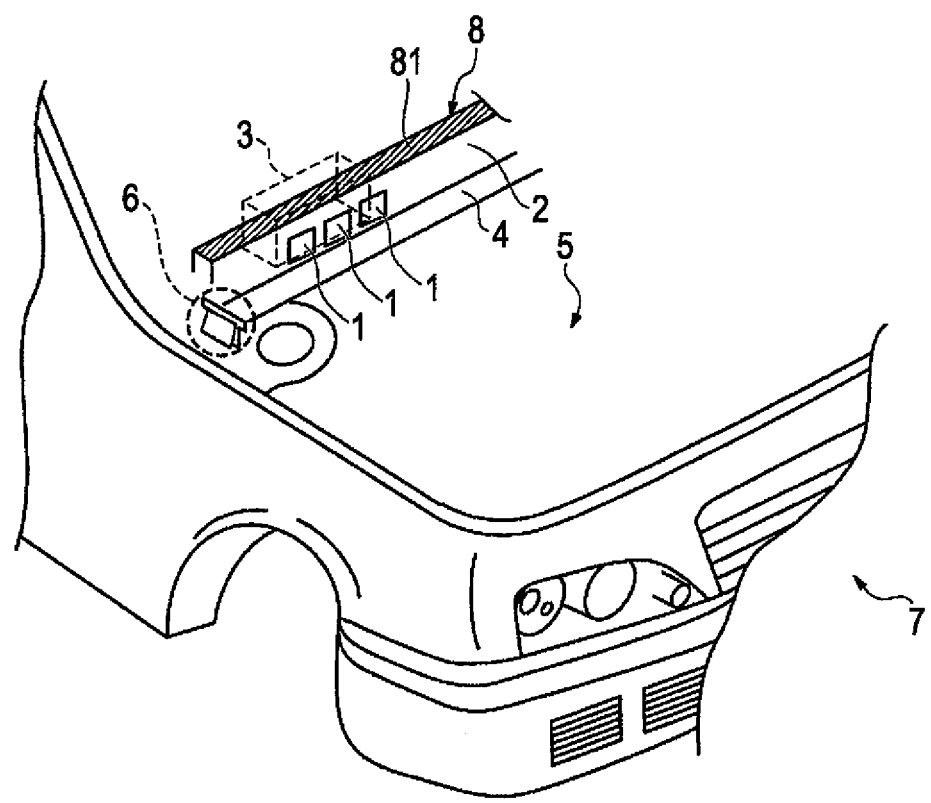
FIG. 1 is a schematic perspective view of a vehicle body structure in accordance with embodiments of the present disclosure.
Figure 2:
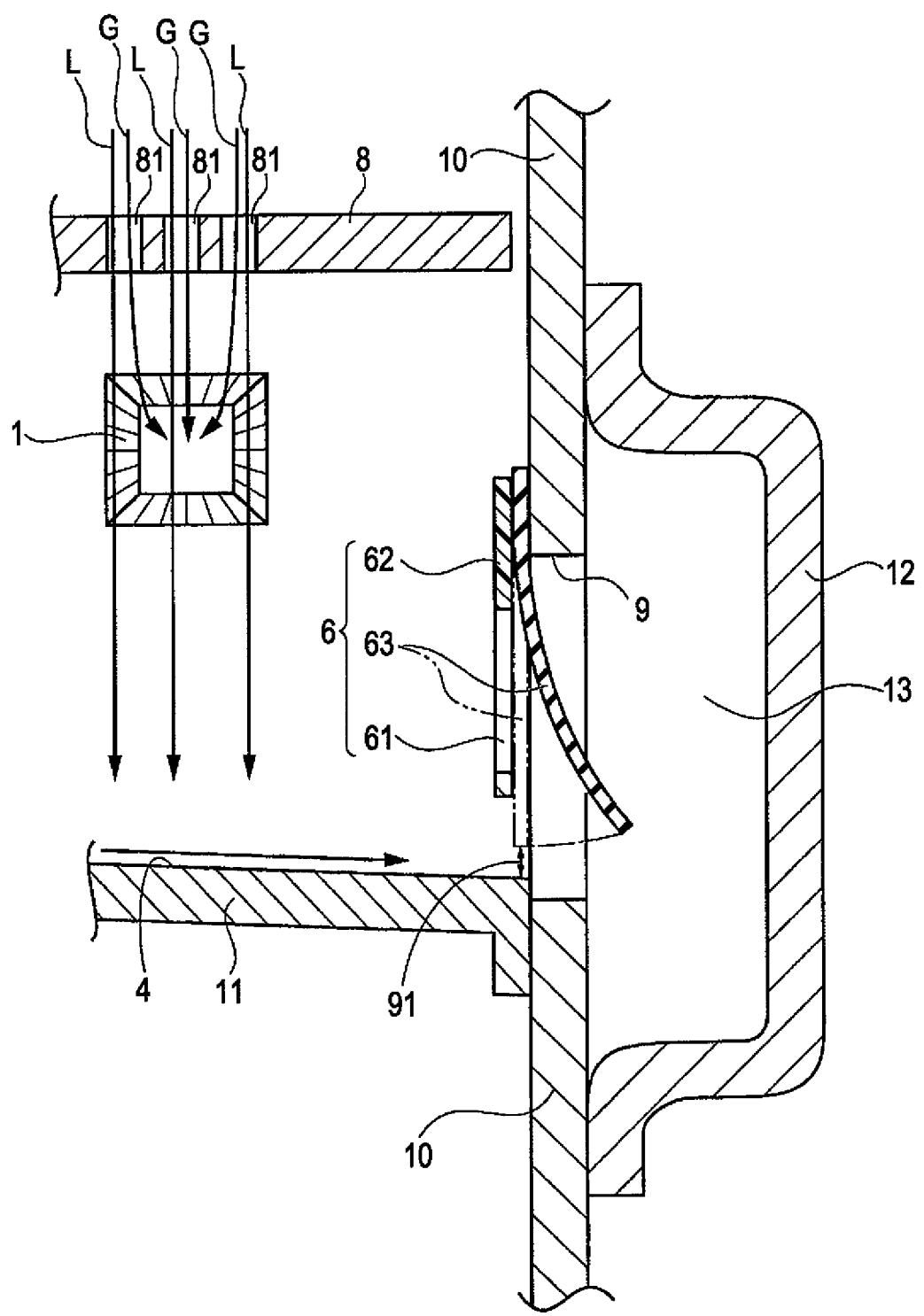
FIG. 2 is a sectional view of an attachment section showing a one-way valve in accordance with embodiments of the present disclosure attached to a vehicle body structure.

The structure of an exemplary embodiment will be described. FIG. 1 is a schematic perspective view of a vehicle body structure. FIG. 2 is a sectional view of an attachment section where a one-way valve is attached to a vehicle body structure.

As shown in FIGS. 1 and 2, the vehicle body structure includes air inlets 1, an air intake channel 2, an intake duct 3, a water discharge channel 4, an engine compartment 5, a one-way valve assembly 6, a vehicle body 7, a vehicle cowl 8, a drain opening 9, a dash panel plate 10, a water gutter 11, a hood ridge 12, and an engine compartment communication space 13.

Air inlets 1 may be provided at a side position behind cowl 8 and introduce outside air into a vehicle cabin. Cowl 8 may be disposed so as to extend in the transverse (i.e., the vehicle width) direction in an upper rearward portion of engine compartment 5 in vehicle body 7. Cowl 8 may comprise a mesh pattern including a plurality of through holes 81 to allow outside air G to pass therethrough. However, rainwater L, in addition to outside air G, may also pass through though holes 81 and reach water discharge channel 4 extending from the bottom surface of cowl 8.

As shown in FIG. 1, intake duct 3 may be disposed behind the air inlets 1 in the front-to-rear direction of the vehicle. Intake duct 3 may be a part of an air conditioning unit and may serve to introduce outside air into the vehicle cabin.

As shown in FIG. 2, water discharge channel 4 may be provided at the bottom of cowl 8 and may be inclined with respect to the vehicle width direction to guide water L entering from above cowl 8 to dash panel plate 10 at an end of cowl 8 in the vehicle width direction. Water discharge channel 4 may include water gutter 11 fixed to the dash panel plate 10, and a bottom side of drain opening 9 may be positioned below the water discharge surface of water discharge channel 4.

Furthermore, as shown in FIG. 2, dash panel plate 10 may comprise drain opening 9 to allow water L flowing downstream along water discharge channel 4 to pass therethrough. Drain opening 9 may be positioned so that it faces hood ridge 12. Hood ridge 12 may be disposed on an outer side of dash panel plate 10 and may function as a (structural) reinforcing member. A space 13 surrounded by dash panel plate 10 and hood ridge 12 may function to allow air and/or fluids to communicate with engine compartment 5.

Referring still to FIG. 2, one-way valve assembly 6 may be disposed inside cowl 8 at a position proximate to and corresponding with drain opening 9. One-way valve assembly 6 may include a valve portion that operates to open and close drain opening 9 in response to a positive and negative pressures generated within air intake channel 2 when outside air G is introduced through air inlets 1.

As shown in FIG. 2, one-way valve assembly 6 may be disposed inside cowl 8 at a position corresponding to drain opening 9 so as to cover all or a substantial portion of drain opening 9. Referring to FIG. 2, one-way valve assembly 6 includes a frame 62 and a blocking member 63. Frame 62 includes valve openings 61 and 61 corresponding to drain opening 9 and blocking member 63 includes slits 65 (shown in FIG. 3A) at positions corresponding to sides of valve openings 61. A peripheral portion of blocking member 63 may be held between frame 62 and dash panel plate 10.

As shown in FIG. 2, air inlets 1 may be disposed at positions offset from drain opening 9 and openings 61 of one-way valve assembly 6.

Figure 3A:
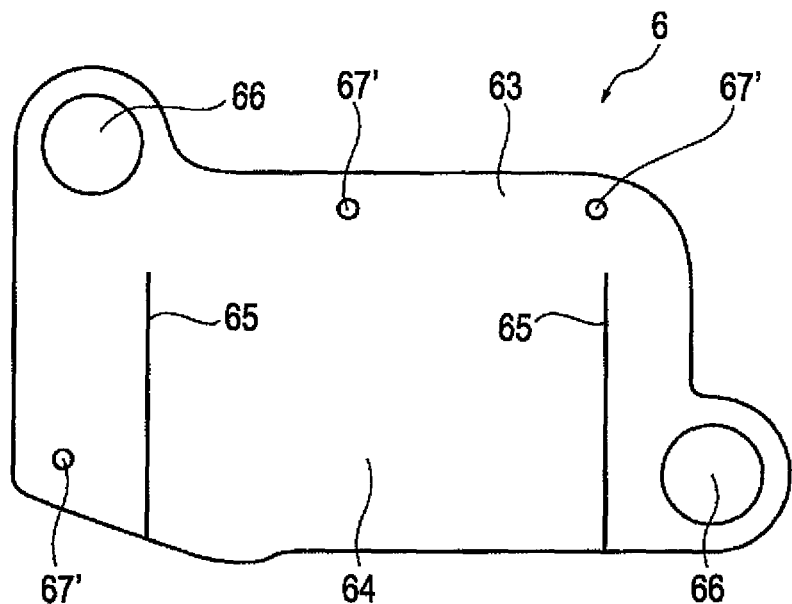
FIG. 3A shows the structure of a one-way valve in accordance with embodiments of the present disclosure viewed from a blocking member side.
Figure 3B:
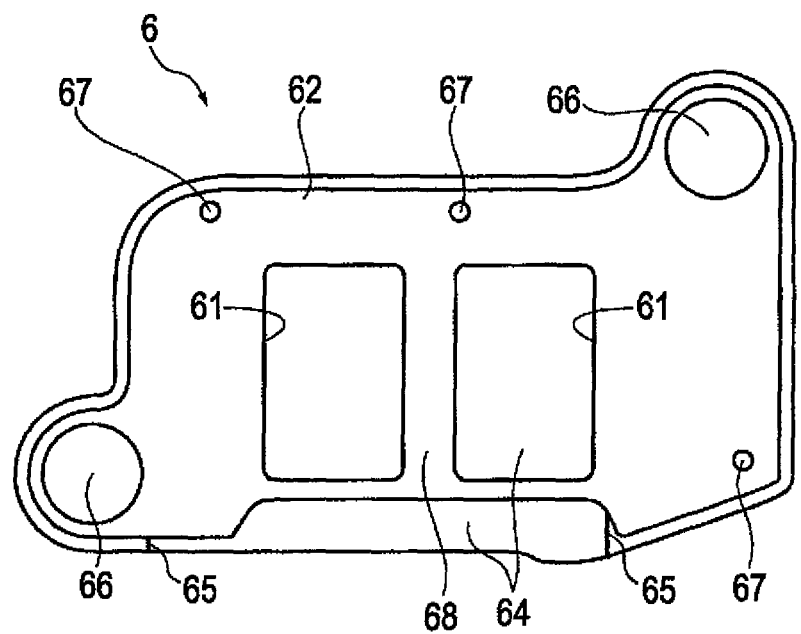
FIG. 3B shows the structure of the one-way valve of FIG. 3A viewed from the valve frame side.

FIGS. 3A and 3B illustrate the structure of one-way valve assembly 6 included in the vehicle body structure according to embodiments of the present disclosure. FIG. 3A depicts one-way valve assembly 6 viewed from the side of blocking member 63 and FIG. 3B depicts one-way valve assembly 6 viewed from the side of frame 62.

Figure 4A:
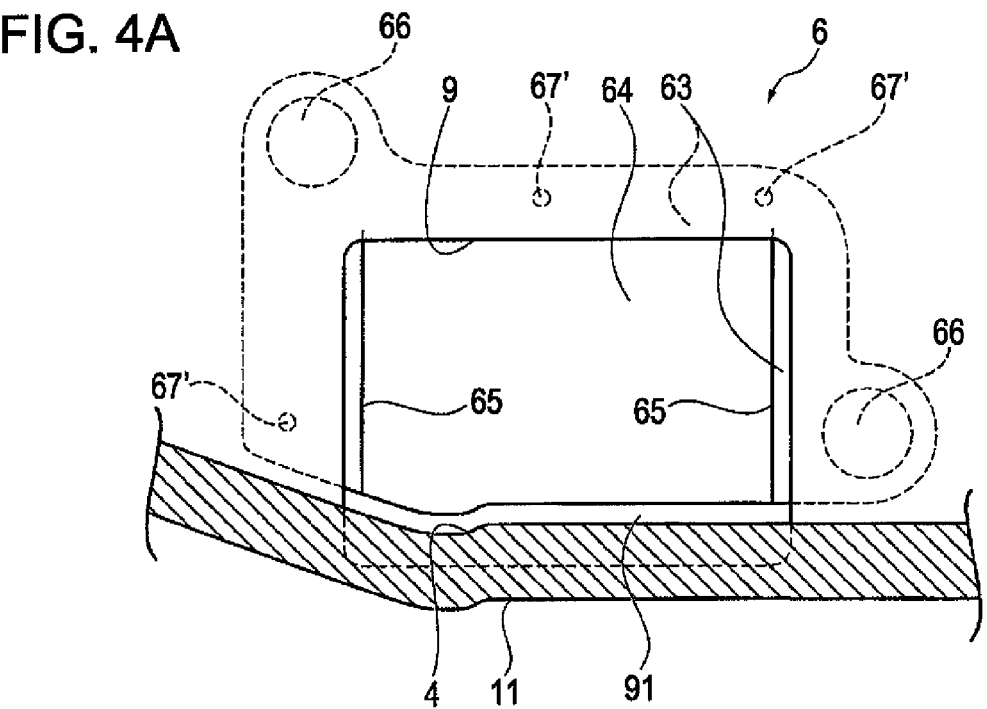
FIG. 4A shows the positional relationship between a one-way valve and a drain opening viewed from the outside of the drain opening.
Figure 4B:
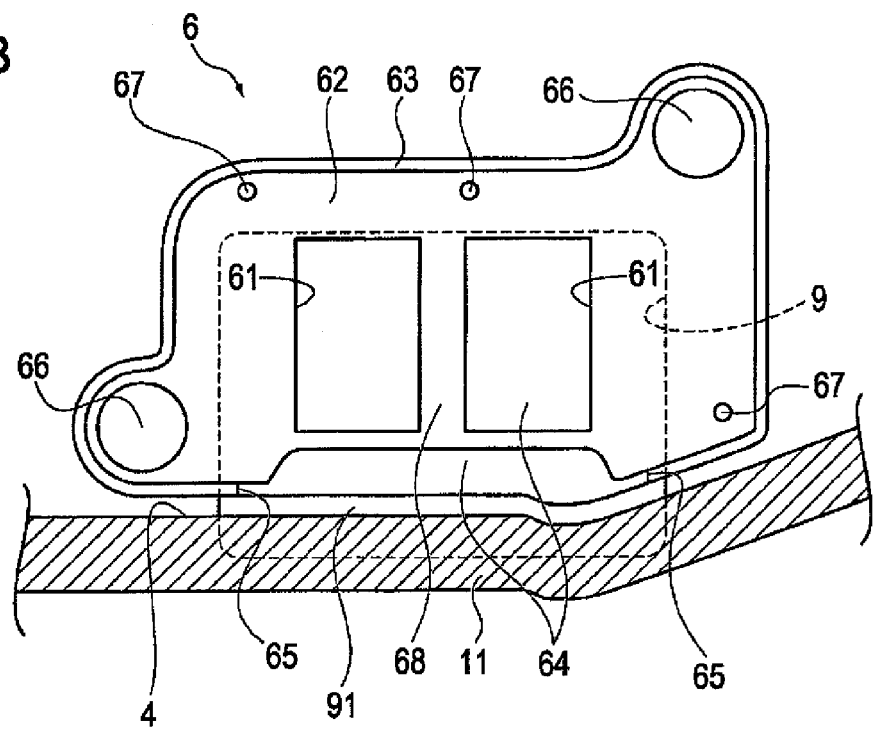
FIG. 4B shows the one-way valve and the drain opening of FIG. 4A viewed from the inside.

Similarly, FIGS. 4A and 4B illustrate the positional relationship between one-way valve assembly 6 and drain opening 9 when valve assembly 6 is installed to the vehicle body structure. As such, FIG. 4A illustrates the positional relationship of one-way valve assembly 6 when viewed from the outside of drain opening 9 and FIG. 4B illustrates the positional relationship of one-way valve assembly 6 when viewed from the inside of the drain opening 9. The structure of the one-way valve assembly 6 will be described below.

In selected embodiments, one-way valve assembly 6 includes a frame 62 made of resin and a blocking member 63 made of a flexible material, such as a rubber sheet. As shown in FIG. 3A, blocking member 63 includes two slits 65 extending in a substantially vertical direction, and a portion between the slits 65 configured to function as a flapper 64 of one-way valve assembly 6.

As shown in FIG. 3B, frame 62 may include a separating portion 68 positioned to divide valve openings 61 and 61 from each other in a central region of frame 62.

Referring to FIGS. 3A and 3B, a geometry of the blocking member 63 may be slightly larger than a geometry of frame 62 such that an outer periphery of blocking member 63 may protrude from the outer periphery of frame 62 by a predetermined amount. Unlike the frame of former one-way valves, frame 62 of one-way valve assembly 6 is not required to cover the cross section of the water channel or to have a drain opening. Therefore, the outer shape of frame 62 may be smaller than the cross section of water discharge channel 4 (see FIG. 5).

Figure 5:
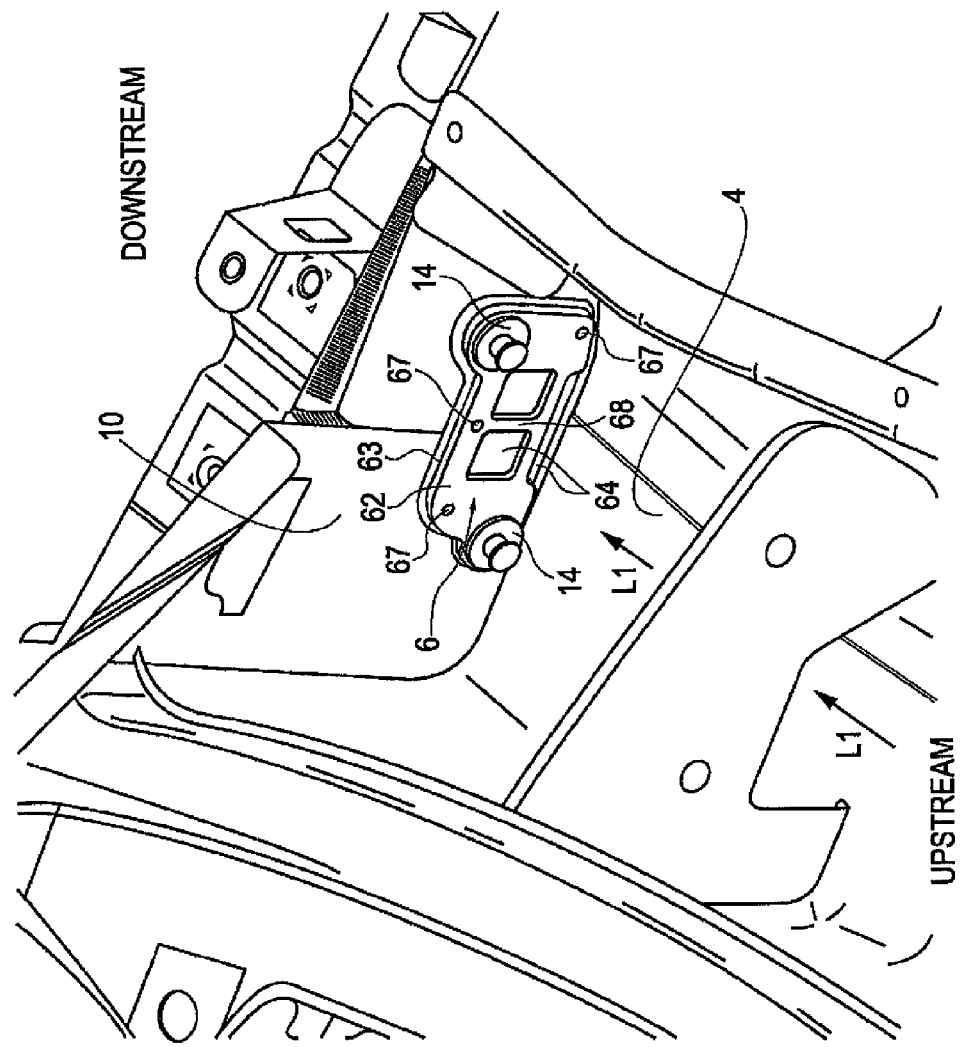
FIG. 5 is a perspective view illustrating a portion of the vehicle body structure where the one-way valve according to the first embodiment is installed.

Furthermore, frame 62 and blocking member 63 may comprise holes 66 at diagonal positions on their periphery so that one-way valve assembly 6 may be secured using to the dash panel plate 10 using fasteners 14 (see FIG. 5). As should be understood by those having skill in the automotive arts, fasteners 14 may include, but are not limited to, fixing clips, rivets, screws, welds, tacks, and the like. Dash panel plate 10 may have fastener-receiving holes at positions corresponding to holes 66. In selected embodiments, frame 62 and blocking member 63 forming one-way valve assembly 6 may be fixed to each other or to dash panel plate 10 using only fasteners 14.

Furthermore, Frame 62 may include a plurality of positioning holes 67 at positions along its periphery, and blocking member 63 may include a plurality of corresponding positioning projections 67' at positions along its periphery. Accordingly, frame 62 and blocking member 63 may be positioned with respect to each other using positioning holes 67 and projections 67'. Frame 62 and blocking member 63 may also be secured together after being stacked together and positioned with respect to each other using with an adhesive or the like along a peripheral region excepting a region where the flapper 64 is disposed.

As shown in FIGS. 4A and 4B, drain opening 9 may be positioned such that a bottom side thereof is located below water a discharge surface of water discharge channel 4, and may have an opening area that is larger than the area of flapper 64 disposed between slits 65.

In addition, as shown in FIGS. 2, 4A, and 4B, one-way valve assembly 6 may be positioned such that a gap 91 is provided in a lower section of drain opening 9. In addition, as shown in FIGS. 4A and 4B, one-way valve assembly 6 may be shaped such that the size of valve openings 61 is smaller than the size of drain opening 9.

Next, the operation will be described. For explanation, the operation of the vehicle body structure according to the first embodiment will be divided into installation of one-way valve assembly 6, discharge of water that enters cowl 8, and prevention of entrance of engine heat into the vehicle cabin.

Installation of the One-Way Valve Assembly

In the process of installing one-way valve assembly 6 in the vehicle body structure according to selected embodiments of the present disclosure, frame 62 and blocking member 63 may be positioned with respect to each other and fixed together prior to installation in the vehicle body. Then, fasteners 14 may be inserted into their respective holes 66 while a peripheral portion of blocking member 63 is held between dash panel plate 10 and frame 62 in a position corresponding to drain opening 9. Thus, one-way valve assembly 6 including frame 62 and blocking member 63 may be installed simply by fixing one-way valve assembly 6 to dash panel plate 10 using fasteners 14 as shown in FIG. 5.

As described above, according to selected embodiments, dash panel plate 10 may serve to partition a water channel and may be provided with a drain opening. Therefore, an outer shape of one-way valve assembly 6 may be smaller than a cross section of water discharge channel 4. As a result, one-way valve assembly 6 may be installed from the inside of dash panel plate 10 having the drain opening 9 (from the side of the water discharge channel 4).

Thus, one-way valve assembly 6 having flapper 64 formed between slits 65 in blocking member 63 may be easily installed by simply inserting fasteners 14 into the holes 66 from the inside of dash panel plate 10.

Additionally, in selected embodiments, an outer shape of blocking member 63 may be slightly larger than an outer shape of frame 62. Therefore, in the state in which the peripheral portion of blocking member 63 is held between frame 62 and dash panel plate 10, the outer portion of blocking member 63 excluding flapper 64 may function as a seal between one-way valve assembly 6 and dash panel plate 10. Thus, it may not be necessary to place an additional seal between one-way valve assembly 6 and dash panel plate 10, thereby reducing the total number of components.

Discharge of Water Entering Cowl

If water L enters cowl 8 from above, water L may push open flapper 64 of one-way valve assembly 6 from the inside.

More specifically, water L entering cowl 8 may flow along the inclined bottom surface of water discharge channel 4 (as shown by arrows L1 in FIG. 5) to dash panel plate 10 disposed at an end of cowl 8 in the vehicle transverse direction. Then, water L may push open flapper 64 of one-way valve assembly 6, and flow to the outside.

In addition, in selected embodiments, one-way valve assembly 6 may be disposed such that gap 91 exists in the lower section of drain opening 9. Therefore, water flowing along the inclined bottom surface of water discharge channel 4 may smoothly flow out through gap 91 without requiring the opening of flapper 64 of one-way valve assembly 6. Accordingly, the amount of residual water in water discharge channel 4 may be reduced.

Prevention of Entrance of Engine Heat into the Vehicle Cabin

When a blower fan of the air conditioning unit operates so as to introduce outside air G into the vehicle cabin through air inlets 1, the pressure at drain opening 9 of dash panel plate 10 may be lowered relative to atmospheric pressure as a result of the suction of the outside air through inlets 1. Thus, a pressure differential is created between the outside of drain opening 9 and the inside of dash panel plate 10. As a result, flapper 64 of one-way valve assembly 6 may close from force resulting from the pressure differential.

Therefore, when outside air G is introduced through air inlets 1, one-way valve assembly 6 is configured to be in a closed state. Accordingly, heat from engine compartment 5 may be prevented from entering cowl 8 (and air inlets 1) through the engine compartment communication space 13 and drain opening 9 of dash panel plate 10. Thus, engine heat is prevented from entering the vehicle cabin from cowl 8 through air inlets 1.

In addition, according to selected embodiments, the size of valve openings 61 in one-way valve assembly 6 may be set to be smaller than a size of drain opening 9. Therefore, in a valve-closed state, blocking member 63 may remain in contact with frame 62 and the closing performance of one-way valve assembly 6 may be ensured.

In addition, according to selected embodiments, air inlets 1 may be disposed at offset positions above valve openings 61. Thus, blocking member 63 of the one-way valve assembly 6 may be prevented from being pulled at an excessive force that might deform blocking member 63. As a result, the valve-closing performance can be ensured even if the suction negative pressure varies or if the pressure difference is temporarily increased.

In addition, according to selected embodiments, valve openings 61 may be formed such that they are separated from each other. Therefore, compared to a case in which the region of frame 62 located between slits 65 of blocking member 62 are not divided, deformation of blocking member 63 with one-way valve assembly 6 in a closed state can be reduced. As a result, the closing performance of valve assembly 6 may be ensured even if a pressure differential applied to blocking member 63 (and flapper 64) varies or increases.

Advantages

The vehicle body structure according to embodiments disclosed herein may provide the following advantages.

First, the vehicle body structure includes cowl 8, air inlets 1, and water discharge channel 4. Cowl 8 may be disposed so as to extend in the vehicle width (i.e., transverse) direction in an upper rear section of engine compartment 5 in vehicle body 7. Air inlets 1 may be positioned to the side and behind cowl 8 to introduce outside air into the vehicle cabin. Water discharge channel 4 may be provided at a bottom of cowl 8 and may be inclined with respect to the vehicle width direction to guide water L entering from above cowl 8 to dash panel plate 10 at an end of cowl 8 in the vehicle width direction. In this vehicle body structure, dash panel plate 10 may have drain opening 9 to allow water L to flow downstream along water discharge channel 4 to pass therethrough. One-way valve assembly 6 may be disposed inside cowl 8 at a position corresponding to drain opening 9. One-way valve assembly 6 may have flapper 64 operating to open and close drain opening 9 in response to a negative pressure generated when outside air G is introduced through air inlets 1. One-way valve assembly 6 may be installed in such a way as to cover drain opening 9. One-way valve assembly 6 may include a frame 62 and a blocking member 63. Frame 62 may have valve openings 61 corresponding to drain opening 9. Blocking member 63 may have slits 65 at positions corresponding to the sides of valve openings 61. The peripheral portion of blocking member 63 may be held between frame 62 and dash panel plate 10. Accordingly, an inexpensive vehicle body structure may be obtained through a simple attachment process, which may quickly discharge water L with high reliability, and which may prevent engine heat from flowing into the vehicle cabin.

Second, a size of valve openings 61 in one-way valve assembly 6 may be set to be smaller than a size of drain opening 9. Therefore, in the closed state, blocking member 63 may come into stable contact with frame 62 and performance of one-way valve assembly 6 may be ensured.

Third, air inlets 1 may be disposed at offset positions above valve openings 61. Thus, closing performance may be ensured even if the negative pressure (i.e., the suction) varies or if the pressure difference increases.

Fourth, one-way valve assembly 6 may be disposed such that a gap 91 is provided in a lower section of drain opening 9. Thus, water flowing along an inclined bottom surface of water discharge channel 4 may flow out smoothly. Accordingly, the amount of residual fluid in water discharge channel 4 may be reduced.

Fifth, valve openings 61 may be divided from each other. Thus, the closing performance may be ensured even if the resultant force from the pressure differential applied to blocking member 63 varies or increases.

In selected embodiments, two valve openings 61 are shown formed such that they are divided from each other. However, one having ordinary skill in the art will appreciate that the number and geometry of valve openings 61 may vary between a single number of openings and an infinite number (e.g., a fine mesh) of openings.

In selected embodiments, clip fasteners 14 are shown to fix one-way valve assembly 6 to dash panel plate 10. However, it should be understood that one-way valve assembly may also fixed to the dash panel plate using other kinds of fixing members, including, but not limited to screws, welds, rivets, bolts, adhesives, and the like. In addition, the number of locations (i.e., holes 66) at which one-way valve assembly 6 is fixed to the dash panel plate may also vary.

In selected embodiments, an outer shape of blocking member 63 may be slightly larger than an outer shape of frame 62. However, it should be understood that blocking member 63 and frame 62 may have substantially similar shapes and sizes.

Advantageously, embodiments disclosed herein may provide an inexpensive vehicle body structure which may be obtained by a simple attachment process, which may be able to quickly discharge water with high reliability, and which may also prevent engine heat from flowing into a vehicle cabin.

Advantageously, during a process of installing a one-way valve assembly in accordance with embodiments disclosed herein, a peripheral portion of the blocking member may be held between a frame and a dash panel plate at a position corresponding to a drain opening. Thus, a one-way valve assembly having the valve portion formed as a portion between slits in a blocking member may be installed from the inside of the dash panel plate having the drain opening.

As a result, an inexpensive vehicle body structure may be obtained through a simple process of attaching a one-way valve assembly. The one-way valve assembly may quickly discharge water with high reliability, while preventing engine heat from flowing into the vehicle cabin.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A vehicle body structure comprising:
    a cowl extending in a vehicle transverse direction at an upper rear section of an engine compartment;
    an air inlet to introduce outside air into a vehicle cabin from the cowl;
    a fluid discharge channel provided at the bottom of the cowl, the fluid discharge channel inclined to guide fluid entering the cowl to a drain opening disposed at a transverse end of the cowl; and
    a one-way valve disposed inside the cowl at a position corresponding to the drain opening;
    the one-way valve comprising:
        a frame comprising a valve opening corresponding to the drain opening; and
        a blocking member comprising slits and a flapper formed between the slits, the flapper operable to cover and uncover the drain opening in response to a differential pressure generated when air flows through the air inlet, and the blocking member is held between the frame and a dash panel plate surrounding the drain opening.

2. The vehicle body structure of claim 1, wherein
    the slits are positioned corresponding to the sides of the valve opening; and
    a peripheral portion of the blocking member is held between the frame and the dash panel plate.

3. The vehicle body structure of claim 1, wherein a size of the valve opening of the one-way valve is smaller than a size of the drain opening.

4. The vehicle body structure of claim 1, wherein the valve opening of the one-way valve comprises two or more divided openings.

5. The vehicle body structure of claim 4, wherein a portion of the frame separating the two or more divided openings prevents movement of the flapper into the cowl.

6. The vehicle body structure according to claim 1 wherein the air inlet is disposed at a position above and transversely offset from the drain opening.

7. The vehicle body structure according to one of claim 1, further comprising a gap located between a lower section of the drain opening and the one-way valve.

8. The vehicle body structure according to one of claim 1, wherein the one-way valve further comprises:
    at least one fastening hole formed in the frame; and
    at least one fastener configured to removably attach the one-way valve to the dash panel plate through the at least one fastening hole.

9. The vehicle body structure according to one of claim 1, wherein the one-way valve further comprises:
    at least one positioning hole formed in at least one of the frame and the blocking member; and
    at least one positioning projection corresponding to the positioning hole and formed in at least one of the frame and the blocking member.

10. A vehicle body structure comprising:
    a cowl extending in a vehicle transverse direction at an upper rear section of an engine compartment;
    an air inlet to introduce outside air into a vehicle cabin from the cowl;
    a means to discharge fluid provided in the cowl, the means to discharge fluid configured to direct fluid entering the cowl to a drain means of the cowl;
    a valve means disposed inside the cowl at a position corresponding to the drain means;
    the valve means comprising:
        a frame comprising a valve opening corresponding to the drain means; and
        a means to block operable to cover and uncover the drain means in response to a differential pressure generated when air flows through the air inlet, and the means to block is held between the frame and a dash panel plate surrounding the drain means.

11. The vehicle body structure of claim 10, wherein a peripheral portion of the means to block is configured to be held between the frame and the cowl proximate to the drain means.

12. The vehicle body structure of claim 10, wherein a size of the valve opening of the valve means is smaller than a size of the drain means.

13. The vehicle body structure according to one of claim 10, wherein the valve means further comprises:
   at least one fastening hole formed in the frame; and
   at least one fastening means configured to removably attach the valve means to the dash panel plate through the at least one fastening hole.

14. The vehicle body structure according to one of claim 10, wherein the valve means further comprises:
   at least one positioning hole formed in at least one of the frame and the blocking member; and
   at least one means to position corresponding to the positioning hole and formed in at least one of the frame and the blocking member.

15. A method to construct a vehicle body structure, comprising:
   installing a one-way valve assembly to a drain opening of a cowl from inside the cowl, wherein the one-way valve assembly comprises a blocking member having slits and a flapper formed between the slits and a frame having at least one valve opening, wherein the blocking member is held between the frame and a dash panel plate surrounding the drain opening;
   securing the one-way valve assembly about the drain opening such that a gap exists between a fluid discharge channel of the cowl and a bottom of the frame;
   creating a seal between a portion of the cowl about the drain opening and the frame with a peripheral portion of the secured blocking member; and
   covering the drain opening and the at least one valve opening with the flapper when air flows from the cowl through a vehicle interior inlet.

16. The method of claim 15, further comprising allowing liquids to flow through the gap between the fluid discharge channel and the bottom of the frame when air flows from the cowl through the vehicle interior inlet.

17. The method of claim 15, further comprising resisting displacement of the flapper into the cowl with a portion of the frame separating the at least one valve opening into at least two valve openings.

18. The method of claim 15, further comprising securing the one-way valve assembly to the cowl using a fastener selected from the group consisting of push clips, rivets, screws, welds, tacks, and adhesives.

19. The method of claim 15, wherein installing the one-way valve assembly comprises fastening the one-way valve assembly to the dash panel plate surrounding the drain opening.

20. The method of claim 15, wherein the one-way valve assembly further comprises:
   at least one positioning hole formed in at least one of the frame and the blocking member; and
   at least one positioning projection corresponding to the positioning hole and formed in at least one of the frame and the blocking member.

\* \* \* \* \*